July 25, 1967  R. L. CALDWELL  3,333,238
SHEAR WAVE ACOUSTIC LOGGING
Filed June 14, 1965  3 Sheets-Sheet 3

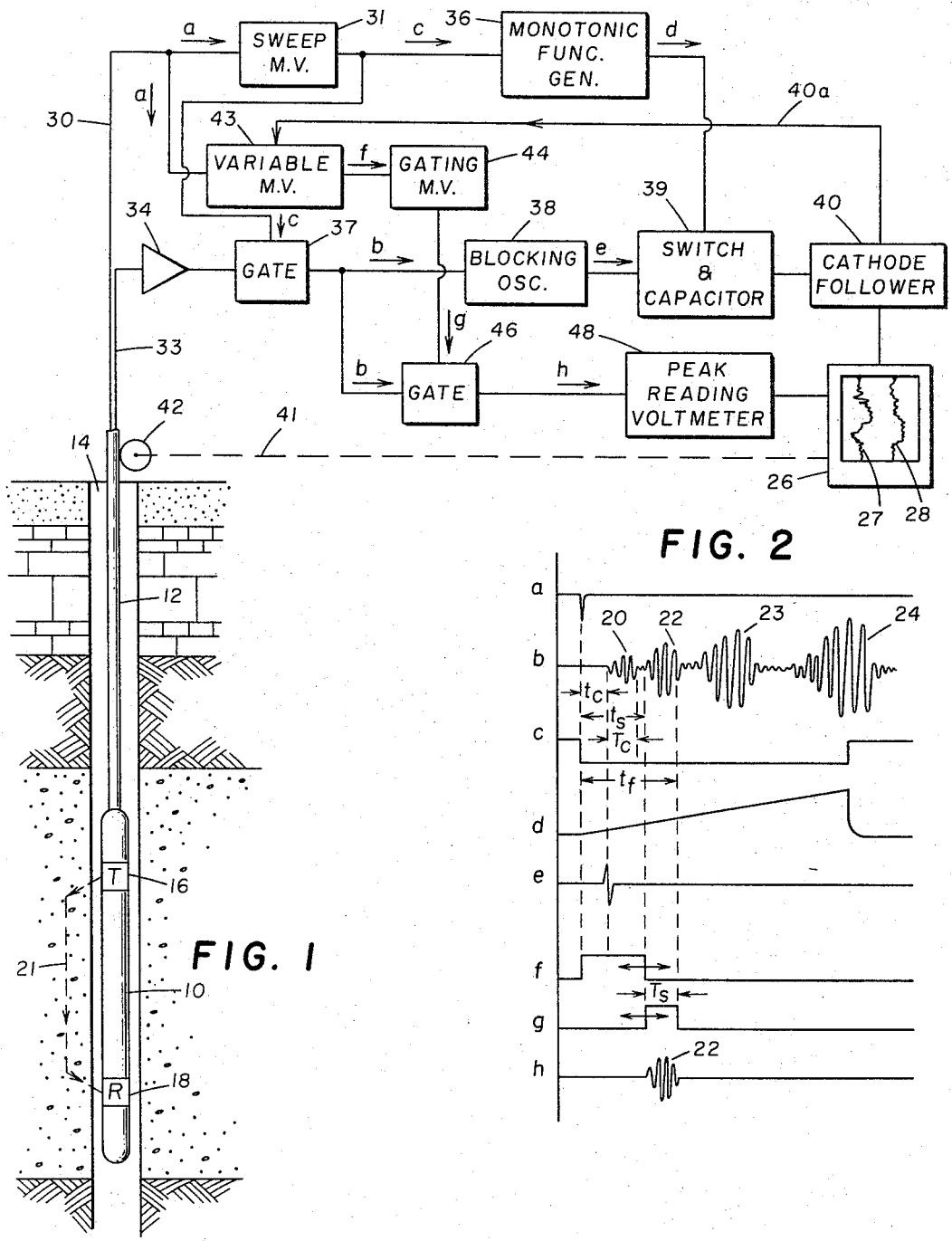

United States Patent Office 3,333,238
Patented July 25, 1967

3,333,238
SHEAR WAVE ACOUSTIC LOGGING
Richard L. Caldwell, Dallas, Tex., assignor to Mobil Oil
Corporation, a corporation of New York
Filed June 14, 1965, Ser. No. 463,671
12 Claims. (Cl. 340—18)

This invention relates generally to acoustic well logging and, more particularly, to the measurement of the amplitude of shear waves which travel through the formations adjacent a borehole.

In acoustic logging, as well known in the art, the acoustic energy arriving at the detector comprises a series of wave trains, each including several separately identifiable events or components. In an uncased borehole, the first-arriving event in each wave train is the compressional wave. It represents acoustic energy that was refracted through the formation adjacent the wellbore, traveling at compressional wave velocity. A compressional wave is defined as a wave in which the direction of displacement at each point of the medium in which the wave travels is parallel to the direction of propagation of the wave. A second-arriving event in each wave train is the shear wave. The shear wave also is refracted through the formations adjacent the wellbore. Unlike the compressional wave, however, the shear wave travels at shear velocity through the formations. The particles of the formation along the path of propagation of the shear wave are vibrated in a direction perpendicular to the direction of propagation. A third-arriving event in each wave train is the direct fluid wave. It travels by the most direct route from the source to the detector via the mud or other fluid in the borehole. Later-arriving events include refracted energy arriving at the detector other than through the most direct route.

There is evidence that the amplitude of the shear wave refracted through formations adjacent a wellbore is a good indicator of the amount of fracturing in the formations. A pronounced reduction in the amplitude of the shear wave compared with other formations along the wellbore indicates a high degree of fracturing.

The major problem of measuring the amplitude of the shear wave of acoustic energy refracted through the formations adjacent a wellbore is that the time of occurrence of the shear wave depends upon the shear velocity of the formation being traversed. Therefore, it is difficult to measure the amplitude of the shear wave during a fixed time segment or gate after generation of the acoustic pulses at the transmitter. If the amplitude of the shear wave is measured over a time segment from the time of generation of the acoustic pulses at the source until just before the arrival of the direct fluid wave, the amplitude of the compressional wave interferes with the measurement whenever the amplitude of the compressional wave is greater than that of the amplitude of the shear wave.

Therefore, it is the primary object of the present invention to measure the amplitude of the shear wave component of acoustic energy refracted through the formations adjacent a wellbore without interference from the compressional wave component of the energy.

In one embodiment of the present invention in acoustic well logging wherein repetitive acoustic pulses from a source are each detected at a detector moved through a borehole in fixed spaced relationship to the source, the amplitude of the shear wave component of each detected acoustic pulse is measured. First, the travel time through the formation adjacent the borehole of the compressional wave component of the acoustic pulse appearing at the detector is measured. Second, the measured travel time is modified to produce a time function representative of the time of occurrence of the shear wave component. Third, the amplitude of the shear wave component is measured, beginning at a time determined by the time function. Finally, the measured amplitude of the shear wave is recorded as a function of depth of the source and detector in the borehole.

In a further aspect of the above embodiment, the measured travel time is modified by a factor related to a fixed, selected value of Poisson's ratio of the formations.

In a further embodiment of the present invention, a control function is generated, representative of the onset of the first-arriving compressional wave in each of a series of wave trains arriving at the detector. The wave trains include, also, a second-arriving shear wave event and a third-arriving fluid wave event. In response to the control function and at a fixed time delay after the onset of the compressional wave at least equal to the period of duration of the compressional wave, there is generated a time gate, the onset of which is representative of the beginning of the shear waves. At a fixed time delay after generation of a trigger signal coincident with the generation of each pulse from the source, the time gate is terminated, just prior to the time of occurrence of the third-arriving fluid wave event. During this time gate, the amplitude of the shear wave event is measured and recorded as a function of depth of the source and detector in the borehole.

For other objects and advantages and a better understanding of the invention, refer now to the following detailed description and accompanying drawings in which:

FIGURE 1 illustrates one embodiment of a shear wave logging system of the present invention, including uphole circuitry in block diagram;

FIGURE 2 illustrates waveforms at selected points in the uphole circuitry of FIGURE 1;

Figure 3:
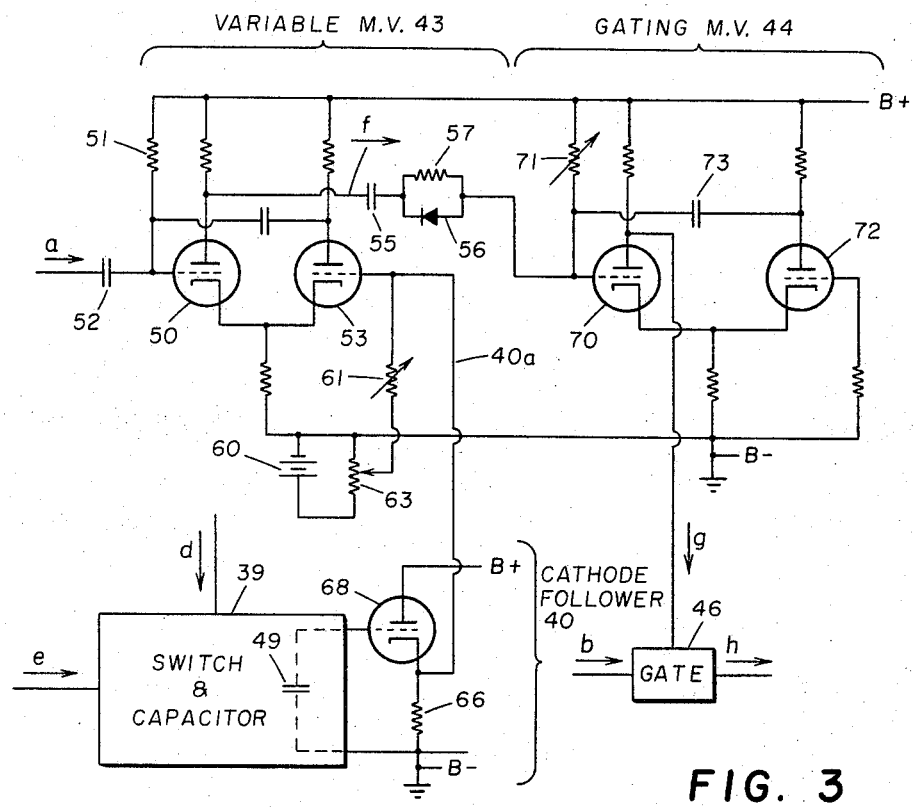
FIGURE 3 illustrates some of the detailed circuits of the block diagrams of FIGURE 1.

Referring to FIGURES 1 and 2, there is illustrated a logging tool 10 suspended by cable 12 for movement along the length of a borehole 14. The logging tool includes an acoustic source or transmitter 16 for the production of repetitive time-spaced pulses of acoustic energy. An acoustic detector or receiver 18 senses each of the generated acoustic pulses and converts them into representative electrical signals. An exemplary signal output of detector 18 is illustrated as waveform b.

Waveform b is shown to comprise a wave train, including several separately identifiable events. An event first arriving at the detector 18 is the compressional wave 20. It represents acoustic energy that was refracted through the formation adjacent the wellbore as, for example, by way of path 21. The compressional wave travels from transmitter 16 as a fluid pressure wave in the wellbore mud to the formation where it travels at the compressional wave velocity of the particular formation. The compressional wave then travels to the receiver 18, again as a fluid pressure wave.

The elapsed time interval between the generation of acoustic energy at source 16 and the detection of the compressional wave at detector 18 is related to the acoustic velocity of the formations adjacent the logging tool. This time interval, of course, neglects travel through the mud between the transmitter and the wall and between the receiver and the wall of the borehole. Since the time of arrival of compressional wave 20 is dependent upon the velocity of the formations traversed by the logging tool, the time of occurrence of the compressional wave will vary, depending upon the depth of the logging tool in the borehole.

The second-arriving event on wave train b is the shear wave 22. The shear wave also is refracted, as, for example, by way of path 21, through the formations adjacent the transmitter and receiver. Unlike the compressional wave, the shear wave travels at shear velocity through the formations. The particles of the formation along the path of propagation are vibrated in a direction perpendicular to the direction of propagation of the wave. As mentioned earlier, there is evidence that the amplitude of the shear wave refracted through the formations adjacent a wellbore is indicative of the amount of fracturing in the formations. A pronounced reduction in amplitude of the shear wave compared with the other formations in the wellbore indicates a high degree of fracturing in a particular formation.

A third-arriving event in the wave train b is the fluid wave 23. It travels to the detector 18 via the mud in the borehole along the most direct path. The exact time of arrival of the fluid wave can usually be calculated since the velocity of sound in the wellbore fluid is virtually constant along the length of the wellbore.

The last-arriving event 24 includes the component of energy refracted through the formations by other than the most direct path. The last-arriving event 24 also includes energy traveling through the mud in the borehole at speeds less than the direct fluid wave 23.

The major problem of measuring the amplitude of the shear wave of acoustic energy refracted through the formations adjacent a wellbore is that the time of occurrence of the shear wave depends upon the shear velocity of the formation being traversed. Thus, it is difficult to measure the amplitude of the shear wave using a fixed time segment or gate after generation of the acoustic pulses at the transmitter 16 over which the shear wave amplitude is measured. However, with the present invention, the travel time of the compressional wave is modified to produce a time function representative of the time of occurrence of a time segment over which the shear wave amplitude is measured. The interference of the compressional wave with the measurement of peak-to-peak amplitude of the shear wave is eliminated. There is no problem of measuring the amplitude of the shear wave even when the peak-to-peak amplitude of the compressional wave is greater than the peak-to-peak amplitude of the shear wave.

With reference to FIGURE 2, the travel time, $t_s$, of the shear wave 22 is related to the travel time, $t_c$, of the compressional wave 20 by the following equation:

$$\frac{t_s}{t_c} = \sqrt{\frac{2(1-\sigma)}{1-2\sigma}} \quad (1)$$

where $\sigma$ is Poisson's ratio for the formation being traversed by the logging tool.

It is known that Poisson's ratio varies from about 0.25 to about 0.30 for subsurface formations down to a depth in the earth of about 10,000 feet. Thus, for example, if a logging run is made in a well beginning at a depth of 10,000 feet where Poisson's ratio for the adjacent formations is about 0.30 and Poisson's ratio varies to about 0.25 as the logging tool is brought up the hole, there is a variation of only 2 percent in the ratio $t_s/t_c$. Accordingly, there may be assigned to $\sigma$ a fixed value. Excellent results may be obtained by assigning a value of 0.26 for $\sigma$. Therefore, Equation 1 becomes:

$$t_s \cong (1.75)t_c \quad (2)$$

Hence, the time of occurrence of the shear wave 22 is related to the time of occurrence of the compressional wave 20 by a factor determined by a fixed, selected value of Poisson's ratio for the formations being traversed.

In accordance with the invention, a quantity proportional to the travel time of the compressional wave through the formations after one pulsing of the transmitter 16 is stored. Then, for the next pulsing of the transmitter and consequent detection of an acoustic wave train at the receiver 18, the stored quantity of the preceding wave train is used to modify the time of occurrence of a time segment or gate during which the shear wave is measured in amplitude. This means for measuring the amplitude of the shear wave in the presence of formations varying in velocity characteristics may be termed a sliding time gate or a sliding time segment.

There will now be described with reference again to FIGURES 1 and 2 one system for measuring the amplitude of the shear wave. In the following description, as logging tool 10 is moved along the length of the borehole, there will be produced two logs as a function of depth on recorder 26. One log is a shear wave log 27. The other log is an acoustic velocity log 28, well known to those skilled in the logging art. There will first be described the apparatus for producing the acoustic velocity log 28. Then, there will be described the apparatus for producing the shear wave amplitude log 27. More particularly, there will be described the means for adjusting a sliding time gate to measure the amplitude of the shear wave, the time of occurrence of the sliding time gate being modified by the acoustic velocity of the formations being traversed.

For a general discussion of velocity logging, see U.S. Patent Re. 24,446, issued to Gerald C. Summers on Mar. 25, 1958.

Transmitter 16 may produce a trigger signal or sync pulse a coincident with each pulse of acoustic energy generated by the transmitter. The sync pulse is applied uphole by way of conductor 30 to a sweep multivibrator 31. As acoustic energy appears at receiver 18, it converts the energy into a representative electrical signal or a series of wave trains. Each of these wave trains is applied uphole by way of conductor 33 to an uphole signal amplifier 34. Each sync pulse a triggers sweep multivibrator 31 to its quasi-stable state for the production of a negative-going output pulse c. The output pulse c is applied to a monotonic function generator 36 for the production of an output waveform d. In this embodiment, the monotonic function d is a ramp function varying linearly from some initial preset value to some final value. When sweep multivibrator 31 again returns to its stable state, the monotonic function generator 36 terminates the ramp function output d.

The negative-going output pulse c from the multivibrator 31 is also utilized to open the receiver signal gate 37. Signal gate 37 is enabled to pass through the downhole signal from amplifier 34 as long as waveform c is negative. As soon as sweep multivibrator 31 returns to its stable state, the gate 37 closes. The purpose of multivibrator 31 and gate 37 is to render the uphole circuitry nonresponsive to spurious noise during all time except immediately after the pulsing of the downhole transmitter.

Now, assume that the sweep multivibrator has opened gate 37 and caused monotonic function generator 36 to initiate production of ramp function d. The downhole wave train b passes through gate 37 to a blocking oscillator 38 which is triggered in response to the onset of the compressional wave 20. The output of the blocking oscillator 38 is a single sharp pulse e. As described in the aforementioned patent to Summers, pulse e is effective to close a normally open electronic switch in block 39 to sample the instantaneous magnitude of the ramp function d and apply this magnitude for storage on a capacitor. The voltage stored on the capacitor then is a quantity representative of the travel time of the last acoustic pulse generated by transmitter 16. The voltage stored on the capacitor is applied by way of an isolating cathode follower circuit 40 to an input of a strip chart recorder 26. One of the pens of recorder 26 varies in excursion according to the voltage stored on the capacitor for the production of a velocity log 28. The recorder 26 is driven in correlation with depth of the logging tool by an electromechanical connection 41 connected to a sheave 42 over which cable 12 passes.

It will be recalled from the description above that the capacitor in block 39 has stored thereon a quantity representative of the travel time of the last preceding compressional wave. Each time a succeeding compressional wave in the series of received compressional waves is detected downhole, the capacitor in block 39 is caused to store thereon a succeeding quantity representative of the travel time of the compressional wave.

For the production of a sliding time gate, during which time the shear wave event 22 is measured in amplitude, an electrical quantity representative of the travel time of the compressional wave 20 is taken from the capacitor in block 39 by way of cathode follower 40 and fed back on conductor 40a to a variable multivibrator 43. The feedback voltage serves as a bias to determine how long multivibrator 43 remains in its quasi-stable state. Thus, when the sync pulse a triggers multivibrator 43, the multivibrator switches to its quasi-stable state for the production of a positive-going output pulse f. The trailing edge of pulse f is controlled in time by the bias on line 40a. Stated otherwise, the time period that variable multivibrator 43 remains in its unstable state is determined by the bias on line 40a, a measure of the velocity characteristics of the formations. When the pulse f goes negative, it is effective to trigger gating multivibrator 44 to its quasi-stable state for the production of a positive-going output pulse g of a fixed time duration. The output pulse g opens gate 46 for a time period or time segment defining the appearance of the shear wave event 22 arriving at the detector 18. The output of gate 46, then, is a waveform h, including only the effect of the shear wave event 22. The maximum peak-to-peak amplitude of waveform h is measured in peak-reading voltmeter 48. Then, the measured amplitude is recorded as a function of depth on strip chart recorder 26 to produce shear wave amplitude log 27. The shear wave amplitude log 27 is a measure of the degree of fracturing of the formations adjacent the wellbore.

In summary, the opening gate 46 is controlled by the sliding time segment, waveform g. The time of occurrence of waveform g is controlled by a modified value of the last preceding measured value of compressional wave travel time stored on the capacitor in block 39. The measured value of travel time is fed back from cathode folower 40 to provide the bias for controlling the time function output, waveform f, of the variable multivibrator 43. Thus, there is provided a sliding time gate defining the time occurrence of the shear wave event 22.

In order to avoid measurement of later-arriving events, including the fluid wave 23, the sliding time gate is limited in duration. The gate length time, waveform g, may suitably be 100 microseconds, which time is adequate to measure the shear wave amplitude yet not extend the measurement into the fluid wave 23. For example, consider a logging tool with a transmitter and a receiver spaced a distance of five feet apart with the velocity of the formations being traversed by the logging tool ranging from about 10,000 feet per second to about 20,000 feet per second. The travel time $t_c$ of the compressional wave 20 will vary from about 250 microseconds to about 500 microseconds. According to Equation 2 above, the travel time $t_s$ of the shear wave 22 will vary from about 437 microseconds to above 875 microseconds. Assuming that the velocity of sound in the borehole mud is about 5000 feet per second, the time of occurrence $t_f$ of the direct fluid wave 23 is about 1000 microseconds. Thus, it may be seen that the sliding time gate, waveform g, will terminate before the occurrence of the fluid wave 23.

There will now be described, with reference to FIGURES 3 and 4, the operation of some of the detailed circuits for providing the sliding time gate of the present invention. In the following, the objective is to describe how the voltage stored on capacitor 49 inside block 39 is used to modify the gate length time of the variable multivibrator 43. The waveforms of FIGURE 2 are indicated at the appropriate points in the circuit of FIGURE 3.

The variable multivibrator 43 is comonly called a monostable multivibrator, the detailed operation of which is described in a book entitled "Waveforms," M.I.T. Radiation Laboratory Series, McGraw-Hill Book Company, Inc., pp. 166–171. The triode 50 is normally conductive since its grid is connected by way of resistor 51 to the positive source of potential B+. Upon receipt of the negative-going trigger pulse a coupled through capacitor 52, the grid of tube 50 is driven negative to reduce the anode-cathode current and thereby lower the cathode voltage and initiate current flow through the second tube 53. The output of multivibrator 43 appearing at the plate of tube 50 is the positive-going pulse f. The time duration of output pulse f controls the time of production of output pulse g by gating multivibrator 44 to thus, in turn, control the time of opening of gate 46 along wave train b for passing through the shear wave event as waveform h.

A biasing circuit coupled to the grid of tube 53 determines the time duration of the output pulse f. The biasing circuit includes a source of negative potential which is represented by battery 60 connected in parallel with a potentiometer 63. The tap of the potentiometer 63 is connected through a variable resistor 61 to the grid of triode 53. The grid of triode 53 is also connected by way of conductor 40a to the output of cathode follower 40 developed across cathode resistor 66 of tube 68. The grid of tube 68 is connected across the capacitor 49. The capacitor 49 has stored thereon a quantity representative of the last-measured travel time of the compressional wave 20. In response to the output pulse e of the blocking oscillator (FIGURE 1), the switch and capacitor unit 39 samples waveform d and stores the measured value on capacitor 49. The output of cathode follower 40 developed across resistor 66 is also applied to the recorder (not shown) for the production of a velocity log.

Figure 4:
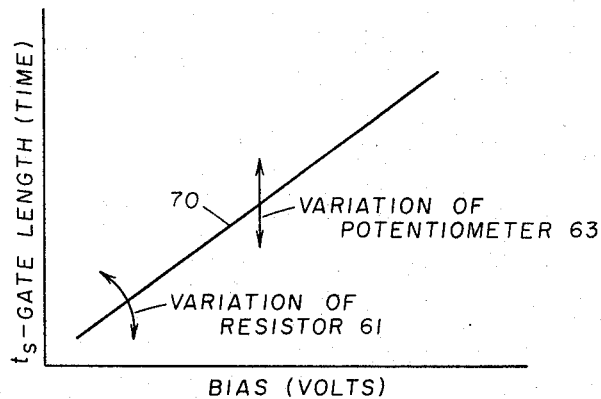
FIGURE 4 is a graph of the variation of gate length time of the output of the variable multivibrator as a function of the bias fed back from the cathode follower.

There is illustrated in FIGURE 4 a graph of the gate length time, $t_s$, of the multivibrator 43 as a function of the bias applied from the output of cathode follower 40. As indicated, varying potentiometer 63 causes curve 70 to move vertically without change in slope. Thus, variation of the potentiometer 63 produces a constant change in length of pulse f for all values of bias voltage. Varying the resistance of variable resistor 61, however, changes the slope of curve 70. If resistor 61 is adjusted such that the slope of curve 70 is very steep, a small change in bias voltage will produce a large change in the length of the output pulse f. But, if variable resistor 61 is adjusted such that the curve 70 is virtually horizontal, the length of pulse f will change very little for large increases in bias voltage. By adjustment of variable resistor 61 and potentiometer 63, the time duration of waveform f may be adjusted so that waveform f terminates according to Equation 2 above. That is, waveform f may be adjusted to go negative at a time which is the travel time, $t_c$, of the compressional wave multiplied by 1.75.

The output of the variable multivibrator 43 is taken from the plate of tube 50 and coupled through a capacitor 55, a diode 56, and a shunting resistor 57 to the grid of tube 70 in the gating multivibrator 44. The polarity of the diode 56 insures that multivibrator 44 responds only to negative-going pulses, i.e., the trailing edge of the pulse f. The operation of gating multivibrator 44 is similar to that described in connection with the variable multivibrator 43. Multivibrator 44 includes a triode 70 whose grid is connected by variable resistor 71 to the positive potential B+. Tube 70 is normally conducting and tube 72 is normally nonconducting. The time constant of an RC circuit including variable resistor 71 and capacitor 73 determines the time duration of the fixed output pulse $g$ encompassing the appearance of the shear wave event. The output waveform $g$ is taken from the plate of tube 70 and applied to the gate 46. Gate 46 then opens in response to the waveform $g$ to pass through the shear wave portion $h$ of the wave train $b$.

In summary of the operation of the circuit of FIGURE 3, in response to the pulse $e$ from the blocking oscillator, switch unit 39 closes momentarily, allowing capacitor 49 to be charged to a potential depending upon the travel time of the last preceding compressional wave. The output of cathode follower 40 is applied by way of conductor 40$a$ to the variable multivibrator to provide a bias that is effective to change the duration of the pulse $f$. By adjusting the variable resistor 61, the effectiveness of the bias voltage produced at the output of the cathode follower can be varied to properly relate the length of pulse $f$ produced by the variable multivibrator to the travel time of the last-received pulse as indicated by the charge on capacitor 49. Adjustment of the potentiometer 63 allows setting the length of pulse $f$ equal to the time computed by using Equation 2.

Figure 5:
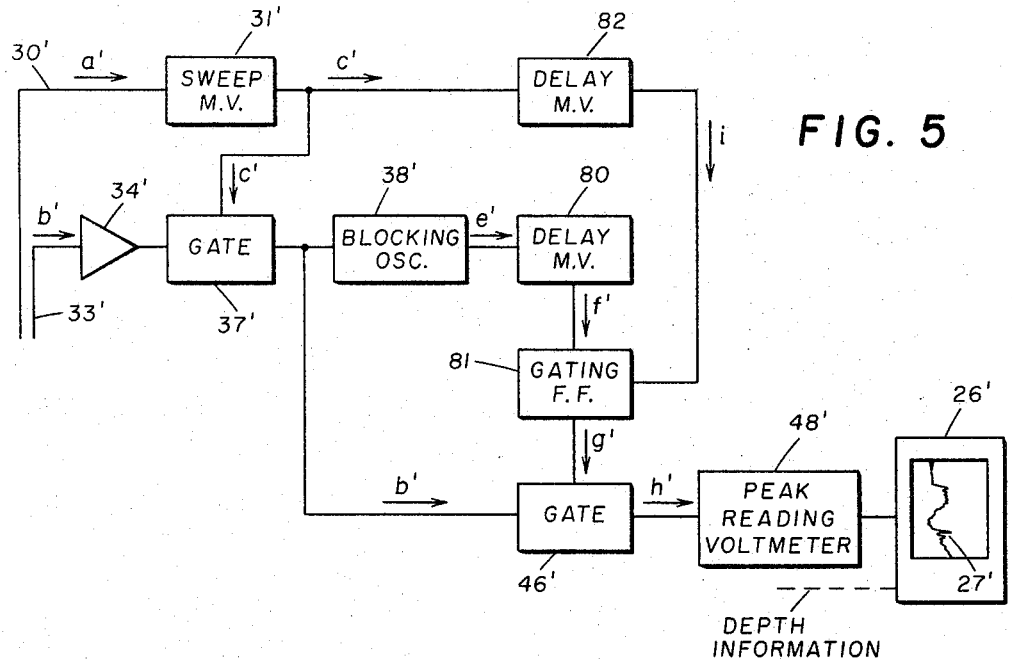
FIGURE 5 illustrates another embodiment of a shear wave logging system.
Figure 6:
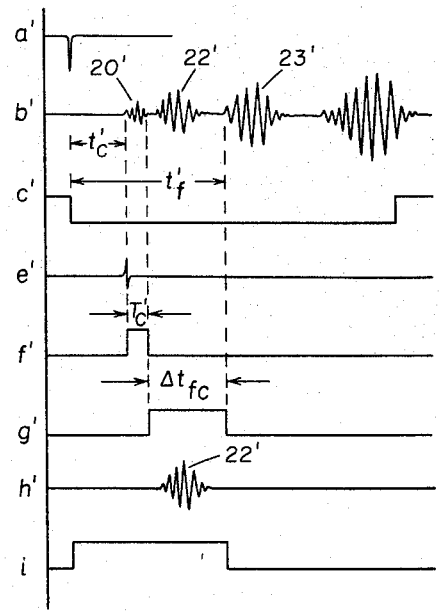
FIGURE 6 illustrates waveforms at selected points in the uphole circuitry of FIGURE 5.

In the embodiment described in the foregoing, the time of occurrence of a sliding gate encompassing the shear wave event was modified by the travel time of the last preceding compressional wave event. The sliding time gate was of fixed duration, encompassing exactly the period of duration, $T_s$, of the shear wave event. Another form of the present invention for measuring the amplitude of the shear wave is illustrated in FIGURE 5. Where the components of the system correspond with the same components in the system of FIGURE 1, the same reference characters are used for these components, identifying them with prime superscripts. The waveforms of FIGURE 6 are taken from the indicated points in the circuit of FIGURE 5. Waveforms corresponding to the ones in FIGURE 2 are given the same letters with prime superscripts.

In the system of FIGURE 5, the amplitude of the shear wave event 22' is measured over a time segment beginning at a fixed time after the onset of compressional wave 20' and terminating at a fixed time after the occurrence of the trigger signal or pulse $a'$ just before the arrival of the direct fluid wave 23'.

Specifically, with the logging tool in operation downhole, trigger pulses $a'$ are applied uphole by way of conductor 30' to trigger sweep multivibrator 31'. When sweep multivibrator 31' switches to its quasi-stable state, there is produced a negative-going output waveform $c'$. The downhole-detected wave train $b'$ is also sent uphole on conductor 33' and applied to an uphole signal amplifier 34'. The amplified wave train $b'$ is applied through gate 37' during a time encompassing waveform $c'$ Upon the first oscillation of the compressional wave event 20', blocking oscillator 38' responds to produce an output pulse $e'$. In response to pulse $e'$, a delay multivibrator 80 is triggered to its quasi-stable state to produce an output pulse $f'$. Delay multivibrator 80 is adjusted to remain in its quasi-stable state a time period $T_c'$ for a fixed time defining the occurrence of the compressional wave 20'. Typically, the time period $T_c'$ is about 150 microseconds. When pulse $f'$ goes negative, gating flip-flop 81 is set to its other stable state to produce a positive-going output pulse $g'$. Gating flip-flop 81 is also known in the art as a bistable multivibrator, the detailed operation of which is described in the aforementioned "Waveforms" reference at pp. 164–166. In response to the positive-going pulse $g'$, gate 46' opens to pass through that portion of the entire wave train beginning after the compressional wave 20'.

To prevent interference of the fluid wave 23' or any other later-arriving events on the measurement of amplitude of the shear wave 22', the gate 46' is closed just prior to the arrival of the fluid wave 23'. The gate 46' is closed when gating flip-flop 81 returns to its former state in response to the trailing edge of pulse $i$ produced from the output of delay multivibrator 82. Delay multivibrator 82 is set to its quasi-stable state also by the same waveform $c'$ which opens gate 37'.

Thus, the peak-reading voltmeter 48' measures the peak-to-peak amplitude of waveform $h'$, including the shear wave event 22', during a time segment $\Delta t_{fc}$, where $\Delta t_{fc}$ is the time segment after the compressional wave and before the direct fluid wave. The measured amplitude from the peak-reading voltmeter is then applied to the strip chart recorder 26' for production of a shear wave amplitude log 27'.

The system described immediately above is particularly suitable where the time of occurrence of the shear wave 22' extends into the time of occurrence of the direct fluid wave 23'. By setting delay multivibrator 82 to produce a negative-going pulse $i$ just before the arrival of the fluid wave, there can be no interference by the fluid wave. In practice, perhaps only the first few cycles of the shear wave will be measured in amplitude before gate 46' closes.

My invention has been described with reference to a single transmitter and single receiver logging tool. The time interval used, in one embodiment, for modifying the time of occurrence of the sliding time gate over which the shear wave is measured in amplitude was the time interval between the generation of an acoustic pulse at the transmitter and the reception of that pulse at the receiver. It will be readily apparent that a single transmitter, two-receiver logging tool may be used where the time interval measurement is made between the reception of an acoustic pulse at the near receiver and the reception of the same acoustic pulse at the far receiver. The amplitude of the shear wave could then be measured, with suitable treatment of the measured time interval, from the signal output of either the near or the far receiver.

In light of the foregoing description of a preferred embodiment and a modification of this invention, those skilled in the art may imagine other modifications, still within the spirit and scope of the invention. It is intended to cover any such modifications as fall within the scope of the appended claims.

What is claimed is:

1. In acoustic well logging wherein repetitive time-spaced pulses of acoustic energy from a source are each detected at a detector moved along a borehole in fixed spaced relationship to the source and wherein the acoustic energy arriving at the detector comprises a series of wave trains, each including a first-arriving compressional wave event and a later-arriving shear wave event, the method comprising the steps of:
    (a) measuring the travel time through the formations of the first-arriving compressional wave event,
    (b) modifying said travel time by a fixed multiplying factor to produce a time function representative of the time of occurrence of the later-arriving shear wave event,
    (c) measuring the amplitude of the shear wave event beginning at a time determined by said time function over a sliding time segment of fixed duration, said time segment beginning at a time after the termination of the compressional wave event, and
    (d) recording the measured amplitude as a function of depth of source and detector in the borehole.

2. A method as in claim 1 wherein said time function causes said sliding time segment to occur at a time equal to said travel time multiplied by a factor related to a fixed selected value of Poisson's ratio for the formations traversed by the borehole.

3. A method as in claim 2 wherein said factor is about 1.75.

4. In acoustic well logging wherein repetitive time-spaced pulses of acoustic energy from a source are each detected at a detector moved along a borehole in fixed spaced relationship to the source, wherein a trigger signal is generated coincident with the generation of each pulse amplitude measuring means in the presence of a control function, (g) control means coupled to the output of said storage means for modifying said quantity by a fixed multiplying factor to produce a control function with a fixed time interval defining the occurrence of the shear wave component of a succeeding acoustic pulse, said fixed time interval beginning at a time after the termination of the compressional wave component, and (h) recording means coupled to the output of said amplitude measuring means for recording the measured amplitude of the shear wave component of each detected acoustic pulse along a scale representative of the depth of said transducers as an index of the degree of fracturing of the formation.

11. Apparatus for eliminating the interference of the compressional wave in measuring the amplitude of the shear wave of each acoustic pulse received at a detector in a borehole acoustic logging system having a generator of repetitive acoustic pulses and a means for measuring the time interval between the generation of each acoustic pulse and the detection of the compressional wave in that pulse after travel through the formations surrounding the borehole, said apparatus comprising:

(a) storage means for storing continuously the output of said time interval measuring means, (b) an amplitude measuring means, (c) a gate interconnecting said detector and said amplitude measuring means for applying the output of said detector only in the presence of a control function, (d) a first monostable device which is triggered into its quasi-stable state upon the generation of each acoustic pulse and which remains in its quasi-stable state for a variable time period related to said stored quantity by a fixed selected value of Poisson's ratio for the formations traversed by said borehole, and (e) a second monostable device whose input is coupled to the output of said first device and which is triggered into its quasi-stable state when said first device returns to its quasi-stable state and remains in that state for a fixed time period defining the occurrence of the shear wave component of a succeeding detected acoustic pulse, said fixed time period beginning at a time after the termination of the compressional wave, the output of said second device being coupled to said gate for supplying said control function during the time period said second device is in its quasi-stable state so that only the shear wave component of said succeeding detected pulse passes to said amplitude measuring means.

12. Apparatus as in claim 11 wherein said first and second monostable devices are monostable multivibrators, each having two active circuit elements.

References Cited

UNITED STATES PATENTS

| Re. 25,928 | 12/1965 | Geyer et al. | 340—18 |
| 2,691,422 | 10/1954 | Summers et al. | 181—0.5 |
| 2,963,646 | 12/1960 | Hicks et al. | |
| 3,177,467 | 4/1965 | Brokaw | 340—18 |
| 3,208,549 | 9/1965 | Alexander et al. | 340—18 X |
| 3,252,131 | 5/1966 | Vogel | 340—18 |
| 3,259,880 | 7/1966 | Zemanek | 340—18 |

BENJAMIN A. BORCHELT, *Primary Examiner.*

R. M. SKOLNIK, *Assistant Examiner.*